April 1, 1952  J. A. WALLEY  2,591,390
MOTOR CONTROL SYSTEM
Filed May 1, 1951  2 SHEETS—SHEET 1

Inventor:
James A. Walley,
by Ernest K. Britton
His Attorney.

April 1, 1952   J. A. WALLEY   2,591,390
MOTOR CONTROL SYSTEM
Filed May 1, 1951   2 SHEETS—SHEET 2
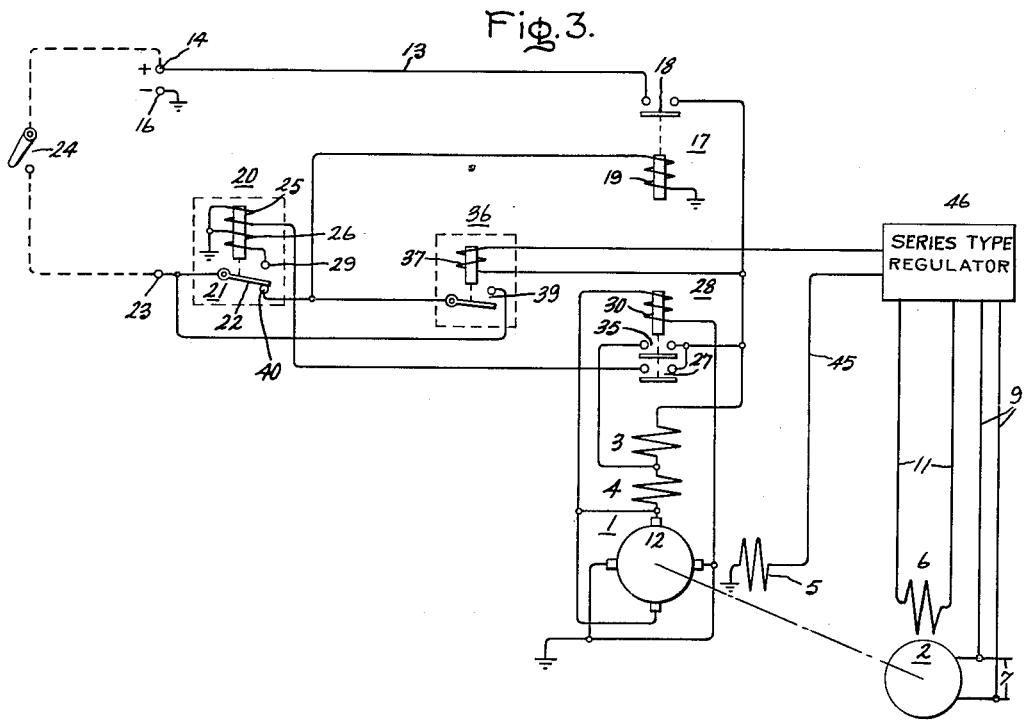
Inventor:
James A. Walley,
by Ernest C. Britton
His Attorney.

Patented Apr. 1, 1952

2,591,390

UNITED STATES PATENT OFFICE 2,591,390

MOTOR CONTROL SYSTEM

James A. Walley, Fort Wayne, Ind., assignor to General Electric Company, a corporation of New York Application May 1, 1951, Serial No. 223,940

11 Claims. (Cl. 318—452)

This invention relates to motor control systems and more particularly to an overspeed protection circuit for a direct current motor controlled by an external regulator.

In the design of certain dynamoelectric machine systems, for example, inverters utilizing a direct current motor driving an alternator, a frequency regulator of the magnetic amplifier type, commonly referred to as an amplistat, may be used to control the motor speed. In such a system, the amplistat regulator is energized from the output of the alternator and since a magnetic amplifier must be saturated to some degree before it will supply any output, the regulated field of the motor will not receive any appreciable power from the amplistat regulator until the output voltage of the alternator increases to a predetermined value. It is therefore desirable to provide protection against overspeed of the motor in the event of failure of the regulator for any reason to provide field excitation of the regulated field at starting, or of malfunctioning of any of the regulator components under extraordinary operating conditions, or in the further event of loss of regulated field through lead breakage or poor connections.

An object of this invention is therefore to provide an improved overspeed protection system for a direct current motor having a regulated field adapted to be energized by an external regulator.

Further objects and advantages of this invention will become apparent and the invention will be better understood by reference to the following description and the accompanying drawing, and the features of novelty which characterizes this invention will be pointed out with particularity in the claims annexed to and forming a part of this specification.

In its broadest aspects, this invention contemplates an armature energizing circuit for a direct current motor having a regulated field winding adapted to be connected to an external regulator. Means are provided for opening the armature energizing circuit responsive to a motor characteristic, for example, armature voltage, in order to secure the proper sequence of operations to provide overspeed protection, and means are further provided responsive to regulator output for rendering the energizing circuit opening means ineffective so that the energizing circuit will not be opened if the regulator is functioning properly.

Figure 1:
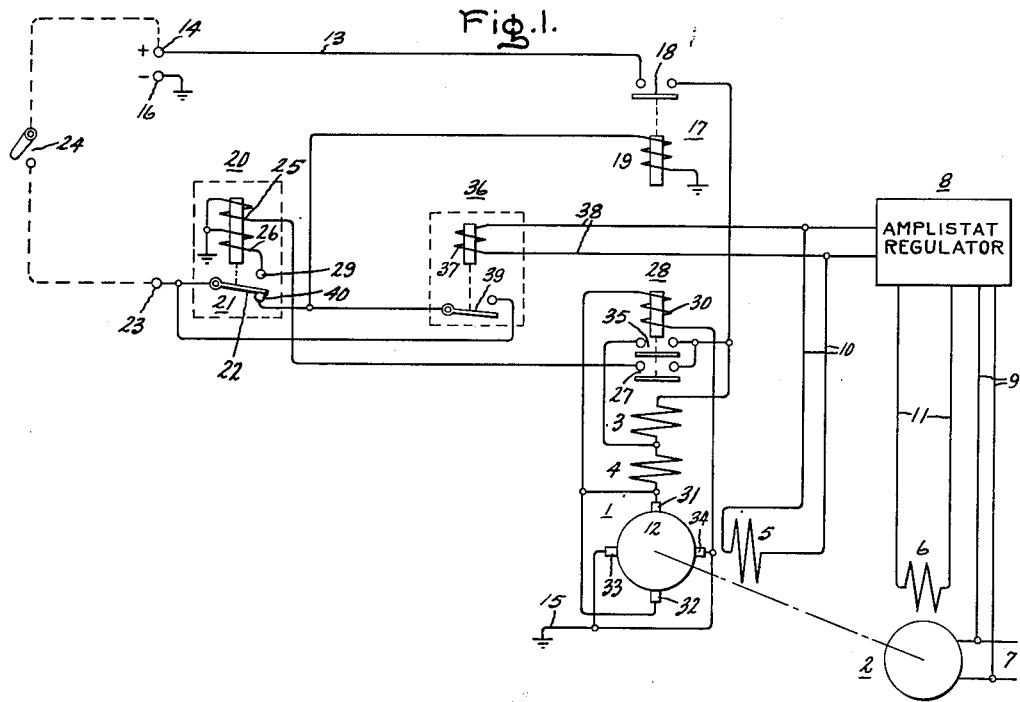
Figure 2:
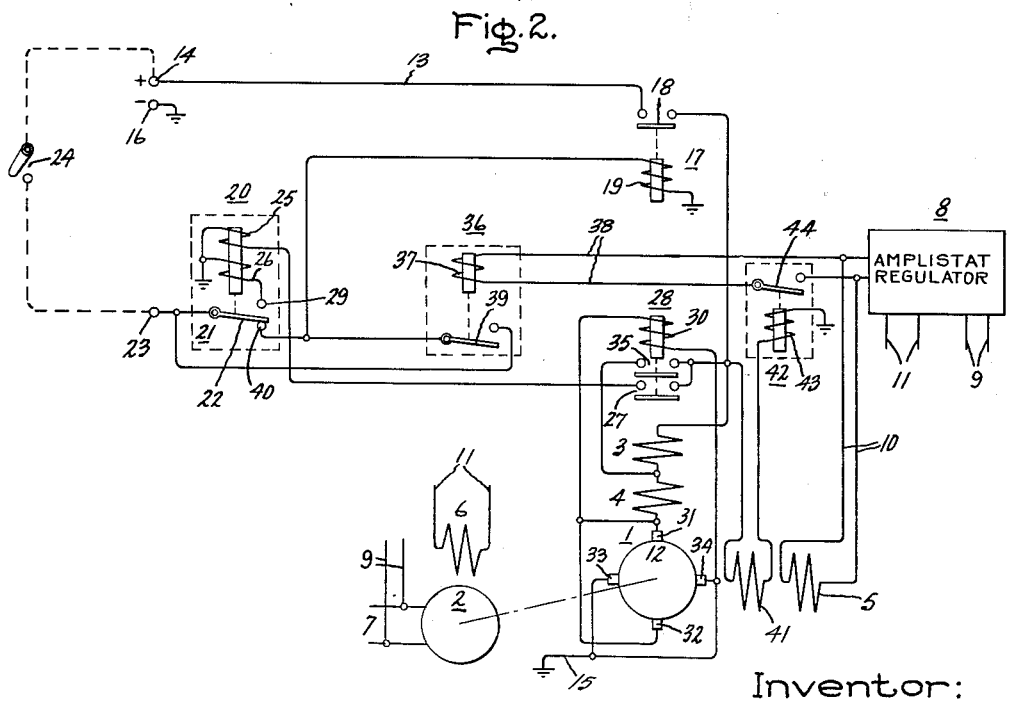

In the drawing, Fig. 1 is a schematic illustration of the improved overspeed protection system of this invention; Fig. 2 is another schematic illustration of the overspeed protection of this invention in which the motor is provided with a shunt field; and Fig. 3 is a schematic illustration of a modification of this invention.

Referring now to Fig. 1, there is shown a direct current motor 1 suitably connected to drive an alternator 2. The motor 1 is provided with a pair of series field exciting windings 3 and 4 and a regulated shunt field exciting winding 5. The alternator 2 is provided with a suitable field exciting winding 6 and its output 7 is connected to an amplistat regulator shown at 8 by means of lines 9. The amplistat regulator 8 serves as a frequency and voltage control for the inverter comprising the motor 1 and the alternator 2 by controlling the regulated motor field exciting winding 5, which is connected to the regulator 8 by means of lines 10, and the output voltage of the alternator 2 by controlling the alternator field exciting winding 6 which is connected to the regulator by means of lines 11. An amplistat regulator which includes both frequency and voltage regulation is more fully shown and described in applications Serial No. 209,961, filed May 31, 1950, and Serial No. 213,277, filed February 28, 1951, of Raymond E. Morgan, assigned to the assignee of the present application. It will be understood that the regulator 8 is not part of this invention and any suitable regulator for the regulated field 5 may be utilized.

The armature 12 of the motor 1, shown here as being contacted by four brushes, although it will be readily understood that a two-brush machine may be used, is energized through a series energizing line 13 connecting the series field exciting winding 3 and positive direct current input terminal 14. The other side of the energizing circuit is shown as being rounded as at 15, although it will be readily understood that a closed circuit may be utilized. The negative D.-C. input terminal 16 is accordingly connected to ground.

In order to provide for overspeed protection for the motor 1 in the event that the amplistat regulator fails to function properly so that the regulated field winding 5 is not energized, a relay 17 is provided having a contact 18 arranged in the energizing line 13 and a coil 19. A second relay 20 is provided having its contact 21 arranged in series with the coil 19 of relay 17. The movable element 22 of the relay 20 is connected to external terminal 23, and in the deenergized position of the relay 20, connects the coil 19 of the relay 17 in circuit with the external terminal 23. External control of the system is provided by connecting an external source of direct current (not shown) across the direct current input terminals 14 and 16 and a switch 24 across the positive direct input terminal 14 and the terminal 23. The relay 20 is provided with an operating coil 25 and a holding coil 26, the coil 25 being energized from the armature energizing line 13 through normally open contacts 27 of relay 28. Holding coil of relay 20 is energized from the positive D.-C. input terminal 14 when coil 25 is energized moving the movable element 22 to its second position 29. Relay 28 includes coil 30 connected across the brushes 31 and 32, and 33 and 34 of motor armature 12. Relay 28 also includes contacts 35 connected across series field exciting winding 3. Finally, a relay 36 is provided having its coil 37 connected for energization from the output of the amplistat regulator 8 by means of lines 38, coil 37 being shown here as being connected in parallel with the regulated motor field exciting winding 5. Relay 36 has a normally open contact 39 connected across the first position 40 of the contact 21 of relay 20.

In operation, when external switch 24 is closed, coil 19 of relay 17 is energized since contact 21 of relay 20 is in its first or unenergized position 40. Energization of coil 19 of relay 17 closes contacts 18, thus energizing series field windings 3 and 4 and armature 12 of motor 1. The motor 1 thus starts with both series field exciting windings 3 and 4 in the circuit. The motor 1 is driving alternator 2 whose output 7 is fed to the amplistat regulator 8 by means of line 9. When the alternator voltage has built up to a predetermined amount, the amplistat regulator 8 will fire, thus energizing the regulated field exciting winding 5 and coil 37 of relay 36, thus closing contact 39. Immediately after closing of relay 36, the armature voltage of motor 1 will have increased to a predetermined value, and coil 30 of relay 28 closes contacts 27 and 35. Contact 35 when closed shorts out the series field 3 and contact 27 energizes coil 25 of relay 20. Movable element 22 of contact 21 thus moves from its first position 40 to its second position 29 energizing holding coil 26. Relay 20 is now locked in since holding coil 26 is directly energized from the direct current input terminal 14 through external switch 24. Coil 19 of relay 17 is now energized, however, through contact 39 of relay 36, so that contact 18 in the motor armature energizing line 13 is not open.

The motor 1 is now running under normal conditions with all of the relays 17, 20, 28 and 36 energized. If for some reason the amplistat regulator 8 fails so that the regulated field exciting winding 5 is de-energized, coil 37 of relay 36 will be de-energized, thus opening contact 39 which is now in series with coil 19 of relay 17. Contact 18 of relay 17 will thus open removing energization from the motor 1 and also de-energizing coil 30 of relay 28. Holding coil 26 of relay 20 is still energized, however, so that the starting cycle for the system cannot be repeated until the external switch 24 is opened. This feature prevents the overspeed protection circuit and motor 1 from cycling in the event of loss of regulated field.

In the event that the amplistat regulator 8 does not fire at starting, coil 37 of relay 36 will not be energized. Thus, coil 19 of relay 17 will first be energized closing contact 18 energizing series fields 3 and 4 and armature 12 of motor 1. As the motor comes up to speed and the armature voltage increases, coil 30 of relay 28 will be energized closing contacts 27 and 35 and energizing coil 25 of relay 20. Movable element 22 of contact 21 will thus pick up to its second position 29 energizing the holding coil 26 and locking up. This opens the circuit of coil 19 of relay 17. However, since coil 37 of relay 36 is not energized and contact 39 thereof is not closed, coil 19 will not be energized and contact 18 will open stopping the machine. It will thus be seen that the relay 20 performs three important functions, i. e., energizing the coil 19 of relay 17 during normal starting before the regulator 8 fires, de-energizing coil 19 of relay 17 in case the regulator does not fire, and preventing cycling of the system after the circuit is once in operation and regulated field is lost.

Referring now to Fig. 2 in which like elements are indicated by like reference numerals, the motor 1 is provided with an additional shunt field winding 41 energized from the armature energizing line 13. In order to provide additional protection, an additional relay 42 is provided having its coil 43 arranged in series with the continuous shunt field exciting winding 41 and its contact 44 in series with coil 37 of relay 36. Relay 42, therefore, is energized through the continuous shunt field exciting winding 41 and will prevent energization of coil 37 of relay 36 or will de-energize the same in case the continuous shunt field exciting winding 41 is open. When the contact 44 of relay 42 is opened, the same situation prevails as though the amplistat regulator had not fired and the motor 1 will stop as described above.

Referring now to Fig. 3 in which like elements are again indicated by like reference numerals, a series type regulator circuit is shown in which coil 37 of relay 36 has one side connected to motor armature energizing line 13 and its other side serially connected to the series type regulator 46, for example carbon-pile regulator. The regulated field exciting winding 5 is in turn serially connected with the regulator 46 through line 45. It will be readily apparent that in the event of loss of the regulated field 5 through an opening in the circuit or through malfunctioning of the regulator 46, coil 37 of relay 36 will be de-energized stopping the machine.

It will now be readily apparent that this invention provides an improved overspeed protection circuit for a direct current motor having a regulated field winding controlled by an external regulator characterized by its simplicity and complete protection against malfunctioning of the regulator and loss of regulated field.

While I have shown and described particular embodiments of this invention, further modifications and improvements will occur to those skilled in the art. I desire it to be understood, therefore, that this invention is not limited to the particular embodiments shown and I intend in the appended claims to cover all modifications which do not depart from the spirit and scope of this invention.

What I claim as new and desire to secure by Letters Patent of the United States is:

1. In a control system for a direct current motor having a regulated field winding adapted to be connected in circuit with a regulator, a circuit for energizing the armature of said motor, means repsonsive to a characteristic of said motor for opening said energizing circuit, and means adapted to be connected in circuit with said regulator and responsive thereto for rendering said circuit opening means ineffective so that said energizing circuit is not opened when said regulator is functioning.

2. In a control system for a direct current motor having a regulated field winding adapted to be connected in circuit with a regulator, a circuit for energizing the armature of said motor, means for opening said energizing circuit, means connected in circuit with said opening means and responsive to a characteristic of said motor for actuating said opening means, and means adapted to be connected in circuit with said regulator and responsive thereto for rendering said opening means ineffective so that said energizing circuit does not open when said regulator is functioning.

3. In a control system for a direct current motor having a regulated field winding adapted to be connected in circuit with a regulator, a circuit for energizing the armature of said motor, means including a first relay having a coil and a contact arranged in said energizing circuit for closing the same, means including a second relay having a contact arranged in circuit with said first relay coil and a coil energized responsive to a characteristic of said motor for opening the circuit of said first relay coil whereby said energizing circuit is opened, and means including a third relay having a contact arranged to render said second relay ineffective and a coil adapted to be connected in circuit with said regulator and responsive thereto whereby said energizing circuit is not opened when said regulator is functioning.

4. In a control system for a direct current motor having a regulated field winding adapted to be connected in circuit with a regulator, a circuit for energizing the armature of said motor, means including a first relay having a contact arranged in said energizing circuit for closing the same and a coil energized responsive to initial application of power to said energizing circuit, means including a second relay having a contact arranged in the circuit of said first relay coil for normally closing the same and a coil arranged for energization responsive to a characteristic of said motor whereby the circuit of said first relay coil is opened and said energizing circuit is opened, and means including a third relay having a contact arranged to render said second relay ineffective and a coil connected in circuit with said regulated field and energized responsive to said regulator whereby said energizing circuit is not opened when said regulator is functioning.

5. In a control system for a direct current motor having a regulated field winding adapted to be connected in circuit with a regulator, a circuit for energizing the armature of said motor, means including a first relay having a contact arranged in said energizing circuit for closing the same and a coil energized responsive to initial application of power to said energizing circuit, means including a second relay having a contact arranged in the circuit of said first relay coil for normally closing the same and a coil arranged for energization responsive to a characteristic of said motor whereby the circuit of said first relay coil is opened and said energizing circuit is opened, means including a third relay having a contact arranged to render said second relay ineffective and a coil connected in circuit with said regulator field and energized responsive to said regulator whereby said energizing circuit is not opened when said regulator is functioning, and means for locking said second relay in its energized position.

6. In a control system for a direct current motor having a regulated field winding adapted to be connected in circuit with a regulator, a circuit for energizing the armature of said motor, means including a first relay having a contact arranged in said energizing circuit for closing the same and a coil energized responsive to initial application of power to said energizing circuit, means including a second relay having a contact arranged in the circuit of said first relay coil for normally closing the same and a coil arranged for energization in response to a predetermined armature voltage of said motor whereby the circuit of said first relay coil is opened and said energizing circuit is opened, and means including a third relay having a contact arranged in the circuit of said first relay coil and a coil adapted to be connected in circuit with said regulator and energized responsive thereto for closing said first relay coil circuit thereby rendering said second relay ineffective so that said energizing circuit is not opened when said regulator is functioning.

7. In a control system for a direct current motor having a regulated field winding adapted to be connected in circuit with a regulator, a circuit for energizing the armature of said motor, means including a first relay having a contact arranged in said energizing circuit for closing the same and a coil energized responsive to initial application of power to said energizing circuit, means including a second relay having a contact arranged in the circuit of said first relay coil for normally closing the same and a coil arranged in circuit with said energizing circuit, means including a third relay having a contact arranged in the circuit of said second relay coil and a coil arranged in circuit with the armature of said motor whereby said second relay coil circuit is opened responsive to a predetermined armature voltage so that said first relay coil is opened opening said energizing circuit, and means including a fourth relay having a contact arranged in said first relay coil circuit and a coil adapted to be connected in circuit with said regulator and energized responsive thereto for closing said first relay coil circuit rendering said second relay ineffective so that said energizing circuit is not opened when said regulator is functioning.

8. In a control system for a direct current motor having a regulated field winding adapted to be connected in circuit with a regulator, a circuit for energizing the armature of said motor, means including a first relay having a contact arranged in said energizing circuit for closing the same and a coil energized responsive to initial application of power to said energizing circuit, means including a second relay having a contact arranged in the circuit of said first relay coil for normally closing the same and a coil arranged in circuit with said energizing circuit, means including a third relay having a contact arranged in the circuit of said second relay coil and a coil arranged in circuit with the armature of said motor whereby said second relay coil circuit is opened responsive to a predetermined armature voltage so that said first relay coil circuit is opened opening said energizing circuit, and means including a fourth relay having a contact arranged in said first relay coil circuit and a coil adapted to be connected in circuit with said regulator and energized responsive thereto for closing said first relay coil circuit rendering said second relay ineffective so that said energizing circuit is not opened when said regulator is functioning, said second relay having a holding coil energized responsive to energization of said first-named coil whereby said first relay coil cannot be reenergized if said third relay contact is opened.

9. In a control system for a direct current motor having a regulated field winding adapted to be connected in circuit with a regulator and a plurality of series field windings, a circuit for energizing the armature and said series windings of said motor, means including a first relay having a contact arranged in said energizing circuit for closing the same and a coil energized responsive to initial application of power to said energizing circuit, means including a second relay having a contact arranged in the circuit of said first relay coil for normally closing the same and a coil arranged in circuit with said energizing circuit, means including a third relay having a contact arranged in the circuit of said second relay coil and a coil arranged in circuit with the armature of said motor whereby said second relay coil circuit is opened responsive to a predetermined armature voltage so that said first relay coil circuit is opened opening said energizing circuit, said third relay having a second contact arranged to short out one of said series field windings, and means including a fourth relay having a contact arranged in said first relay coil circuit and a coil adapted to be connected in circuit with said regulator and energized responsive thereto for closing said first relay coil circuit rendering said second relay ineffective so that said energizing circuit is not opened when said regulator is functioning.

10. In a control system for a direct current motor having a regulated field winding adapted to be connected in circuit with a regulator and a second shunt field winding, a circuit for energizing the armature of said motor, means including a first relay having a contact arranged in said energizing circuit for closing the same and a coil energized responsive to initial application of power to said energizing circuit, means including a second relay having a contact arranged in the circuit of said first relay coil for normally closing the same and a coil arranged for energization responsive to the characteristic of said motor whereby the circuit of said first relay coil is opened and said energizing circuit is opened, means including a third relay having a contact arranged to render said second relay ineffective and a coil connected in circuit with said regulated field and energized responsive to said regulator whereby said energizing circuit is not opened when said regulator is functioning, and means including a fourth relay having a contact arranged in circuit with said third relay coil and a coil arranged in circuit with said shunt field winding whereby said third relay contact is opened when said shunt field winding is not energized.

11. In a control system for a direct current motor having a regulated field winding adapted to be connected in circuit with a regulator and another shunt field winding, a circuit for energizing the armature of said motor, means including a first relay having a contact arranged in said energizing circuit for closing the same and a coil responsive to initial application of power to said energizing circuit, means including a second relay having a contact arranged in the circuit of said first relay coil for normally closing the same and a coil arranged in circuit with said energizing circuit, means including a third relay having a contact arranged in the circuit of said second relay coil and a coil arranged in circuit with the armature of said motor whereby said second relay coil circuit is opened responsive to a predetermined armature voltage so that said first relay coil circuit is opened opening said energizing circuit, means including a fourth relay having a contact arranged in said first relay coil circuit and a coil adapted to be connected in circuit with said regulator and energized responsive thereto for closing said first relay coil circuit rendering said second relay ineffective so that said energizing circuit is not opened when said regulator is functioning, and a fifth relay having a contact arranged in the circuit of said fourth relay coil and a coil arranged in the circuit of said shunt field whereby said fourth relay coil is de-energized when said shunt field is not energized.

JAMES A. WALLEY.

No references cited.